Patented Jan. 5, 1937

2,066,742

UNITED STATES PATENT OFFICE 2,066,742

ANTIMONY COMPOUNDS OF POLYHYDROXY CARBOXYLIC ACIDS AND PROCESS OF MAKING THEM

Hans Schmidt, Wuppertal/Vohwinkel, Germany, assignor to Winthrop Chemical Company Inc., New York, N. Y., a corporation of New York No Drawing. Application December 5, 1930, Serial No. 500,434. In Germany December 12, 1929

12 Claims. (Cl. 260—11)

The present invention relates to new complex compounds of polyhydroxy carboxylic acid of trivalent antimony, yielding neutral solutions, and to a process of preparing the same.

Taking as a basis the known formation of tartar emetic by dissolving antimony oxide in acid potassium tartrate, antimonyl mucates have been produced by boiling the solution of acid salts of mucic acid with antimony oxide. These compounds of trivalent antimony are described as not very stable, they are sparingly soluble in cold water, but more readily soluble in hot water. In consequence of their low solubility in water and the acid reaction of their solutions such solutions are not suitable for therapeutic purposes. The transformation of the acid antimony potassium tartrate into its neutral salt, however, proved impossible, since the said acid antimony complex salt is decomposed on neutralization.

In accordance with the present invention neutral water-soluble complex salts of trivalent antimony with a saturated, that is, aliphatic or alicyclic polyhydroxy carboxylic acid containing at least 5 carbon atoms and three hydroxy groups bound to three adjoining carbon atoms, are obtainable by reacting upon a preferably aqueous or aqueous-alcoholic solution of the said acid with a trivalent antimony compound, such as antimony oxide, antimony hydroxide or mineral acid salts thereof, for example, antimony sulfate and antimony halogenides, such as antimony-trichloride, -tribromide and -trifluoride, and neutralizing the reaction mixture with a basically reacting substance.

As polyhydroxy carboxylic acids of the said kind preferably the acids obtainable by oxidation of carbohydrates have proved suitable, for example, polyhydroxy-carboxylic acids of the pentane and hexane series, such as pentonic acids, for example, arabonic-, xylonic-, and 2-methyl-pentane-tetrolic acid, hexonic acids, for example, gluconic, galactonic, mannonic and talonic acid, trihydroxy glutaric acids, tetrahydroxy adipic acids, for example, saccharic-, isosaccharic-, mucic- and manno-saccharic acid and the like. Also acids derived from disaccharoses which contain two polyhydroxy hexane residues combined with an ether-like bound oxygen atom, for example, lactobionic acid, have proved useful in the manufacture of the new antimony complex compounds. Likewise alicyclic polyhydroxy carboxylic acids containing at least three hydroxy groups bound to three adjoining carbon atoms, for instance, quinic acid, may be employed in my present process.

As bases for the neutralizing process alkalies, preferably alkali metal hydroxides or nitrogen bases, such as ammonia, mono-, di- and triethylamine, ethylenediamine, diethylaminoethanol and piperazine have proved useful.

When starting with an antimony halogenide, for instance, antimony trichloride, obviously antimony hydroxide, produced while neutralizing, for instance, the aqueous-alcoholic solution of antimony trichloride and the polyhydroxy carboxylic acid, enters into the reaction in its status nascendi. This is also the case when adding a solution of antimony trichloride to an alkaline solution of the polyhydroxy carboxylic acid.

The new complex compounds of trivalent antimony thus obtainable are in general colorless powders which dissolve in water with a neutral reaction. Such solutions remain clear on the addition of dilute caustic soda lye, but hydrogen sulfide precipitates antimony sulfide from the solution acidified with tartaric acid.

From these properties it appears that the antimony is bound in the new compounds in a complex state. I presume that the antimony is bound to the hydroxy groups of the polyhydroxy carboxylic acid and that the formation of my new compounds proceeds, for instance, in accordance with the following equation:

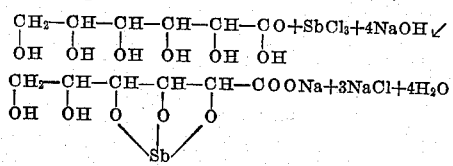

when employing on one mol. of gluconic acid one mol. of antimony trichloride. However, it is to be understood that the formation of complex compounds of trivalent antimony with polyhydroxy carboxylic acids, yielding neutral aqueous solutions is not limited to compounds wherein the antimony is contained in stoichiometric proportions. Complex compounds of the kind mentioned are likewise obtainable when employing a quantity of the antimony compound which is above or below one mol. on one mol. of polyhydroxy carboxylic acid.

The action of the polyhydroxy carboxylic acids containing at least 5 carbon atoms and at least three hydroxy groups was not to be anticipated, especially since it is known that the solution of tartar emetic which is acid in reaction precipitates antimony hydroxide on neutralization.

The new complex compounds are suitable for therapeutic application, particularly as preparations for injection or as intermediate products for such substances and also for other technical purposes.

The invention is illustrated by the following examples, without being restricted thereto:—

*Example 1.*—23 grams of antimony trichloride are dissolved in 30 ccs. of methyl alcohol and 40 ccs. of a 50% aqueous solution of gluconic acid are added. 5 normal caustic soda is then added until the reaction is neutral. The greater part of the antimony oxide precipitated at the beginning dissolves towards the end. 40 ccs. of water are added and the whole is heated for about half an hour on the water bath. The clear or nearly clear solution is filtered and cooled and the complex salt formed is precipitated by stirring into methyl alcohol; after washing with methyl alcohol it is dried in the desiccator and then in the air. About 33 grams of a colorless powder are obtained, which may be dissolved readily in water with a neutral reaction, for example, to produce a 10% solution isotonic to tissue. The solution remains clear on the addition of dilute caustic soda lye. Hydrogen sulfide precipitates antimony sulfide from the solution acidified with tartaric acid.

The complex compound obtained contains about 33% of antimony; its composition corresponds to the following probable formula:—

CH₂OH—CHOH—CH—CH—CH—COONa.2H₂O
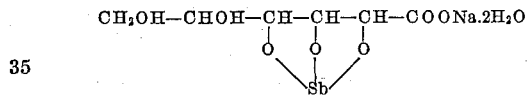

By the use of excess antimony trichloride also compounds of a higher antimony content are obtainable. For example, by starting in the above example with 34 grams of antimony trichloride a product containing about 39% of antimony bound in complex form is obtained, which likewise yields clear neutral aqueous solutions. Alternatively by starting in the above example with 12 grams of antimony trichloride about 20 grams of a product containing about 23% of antimony bound in complex form are obtainable. This product likewise dissolves in water to a clear solution with neutral reaction.

Furthermore, complex compounds may be produced by heating gluconic acid with freshly precipitated antimony trioxide and neutralizing.

*Example 2.*—10 grams of the acid potassium salt of saccharic acid are dissolved in a mixture of 25 ccs. of water and 32 ccs. of 5 normal caustic soda. To this solution is added while stirring and heating a solution of 9.5 grams of antimony trichloride in 25 ccs. of methyl alcohol. The precipitate formed soon dissolves on heating. The solution is filtered and the complex salt formed precipitated from the neutral or neutralized solution by pouring it into one liter of methyl alcohol while stirring. After isolation and drying about 15 grams of a colorless powder are obtained, which may be dissolved readily in water with a neutral reaction, for example, to produce a 7.5% solution which is isotonic to tissue. The solution remains clear on the addition of dilute caustic soda. Hydrogen sulfide precipitates antimony sulfide from the solution acidified with tartaric acid.

The complex compound obtained contains about 28% of antimony bound in complex form; its composition corresponds to the probable general formula:—

KOOC—CHOH—CH—CH—CH—COONa.3H₂O
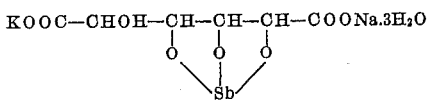

In an analogous manner by replacing the normal caustic soda by, for example, 5 normal diethylamine solution a corresponding complex salt containing diethylamine is obtained.

As described in Example 1 in this case also products of a higher antimony content may be produced. For example by starting in the above case with 15 grams of antimony trichloride and a correspondingly higher quantity of caustic soda lye a complex compound containing about 38% of antimony bound in complex form is obtainable, which readily dissolves in water, for example, to a 10% solution.

By starting in the above example with 4.5 grams of antimony trichloride and a correspondingly smaller quantity of caustic soda lye, about 12.5 grams of a complex compound containing about 18% of antimony bound in complex form are obtained, which likewise readily dissolves in water.

Also in this case complex compounds may be prepared by heating, for example, the sodium-potassium salt of saccharic acid in aqueous solution with freshly precipitated antimony trioxide.

In an analogous manner complex salts giving neutral solutions are obtainable, for example, from galactonic acid, mannonic acid, lactobionic acid and 2-methyl-tetrahydroxybutane carboxylic acid.

*Example 3.*—31.5 grams of mucic acid are boiled for 24 hours under a reflux condenser with 300 ccs. of water and 30 ccs. of 5 normal caustic soda with the addition of 45 grams of still moist antimony oxide paste. The acid liquid is filtered hot, treated with dilute caustic soda until the reaction remains permanently neutral, concentrated and after cooling precipitated by stirring into methyl alcohol. About 22 grams of a nearly colorless powder containing about 17% antimony are obtained, which dissolves in water with a neutral reaction on slight heating. The aqueous solution does not give a precipitate on the addition of dilute caustic soda. After the addition of tartaric acid hydrogen sulfide precipitates antimony sulfide.

*Example 4.*—An aqueous solution of 9.5 grams of quinic acid is heated for some time with 15 grams of a still moist paste of antimony oxide. Then the undissolved antimony oxide is filtered off and the filtrate obtained is neutralized with a diluted aqueous diethylamine solution.

In this manner a neutral stable aqueous solution of antimony bound in complex form is obtained. By the addition of caustic soda lye no precipitate is produced, hydrogen sulfide precipitates antimony sulfide from the acidified solution.

*Example 5.*—11.5 grams of antimony trichloride are dissolved in 15 ccs. of methyl alcohol. Thereto 20 ccs. of a 50% gluconic acid and such a quantity of a dilute solution of ethylene diamine are added that the liquid displays just a weakly alkaline reaction. After the addition of 25 ccs. of water the solution is heated on the water bath. Hereafter the solution is filtered and the filtrate is poured into methylalcohol while stirring. The ethylene diamine salt of the antimony gluconic acid separates as a nearly colorless powder readily soluble in water with a neutral reaction.

In analogous manner, for instance a dilute diethylamine solution may be employed for the neutralization. Thus a solution of the complex compound is obtained from which the complex compound, however, is not to be precipitated by methylalcohol but by ethylalcohol.

The term "alkali" used in the appended claims is intended to include the alkaline reacting compounds of the alkali metals as well as amines.

I claim:—

1. A neutral complex compound of the trivalent antimony with neutral alkalimetal saccharate, said product being a colorless powder, clearly soluble in water, and not being precipitated by dilute alkalies from its aqueous solution, being a valuable medicinal medium.

2. A neutral complex compound of trivalent antimony with the potassium-sodium salt of saccharic acid, said compound having the formula $C_6H_5O_8SbKNa.3H_2O$ and being a colorless powder, readily soluble in water with neutral reaction, the aqueous 7.5% solution thereof being isotonic to tissue and separating no precipitate on the addition of dilute caustic soda lye, said powder precipitating from its solution acidified by tartaric acid antimony sulfide when introducing hydrogen sulfide.

3. The process which comprises reacting upon a solution of a saturated polyhydroxy carboxylic acid containing at least three hydroxy groups bound to three adjoining carbon atoms, with a trivalent antimony compound of the group consisting of antimony-oxide, antimony-hydroxide and mineral acid salts thereof, and neutralizing the reaction mixture with an alkali.

4. The process which comprises reacting upon an acid of the group consisting of polyhydroxy carboxylic acids of the pentane, hexane and cyclohexane series, containing at least three hydroxy groups bound to three adjoining carbon atoms, with a trivalent antimony compound of the group consisting of antimony-oxide, antimony-hydroxide and antimony-halogenides, and neutralizing the reaction mixture with an alkali.

5. The process which comprises reacting upon an acid of the group consisting of gluconic-, saccharic-, mucic-, galatonic-, mannonic- and quinic-acid with a trivalent antimony compound of the group consisting of antimony-oxide, antimony-hydroxide and antimony-halogenides, and neutralizing the reaction mixture with an alkali.

6. The process which comprises reacting upon an acid of the group consisting of gluconic-, saccharic-, mucic-, galactonic-, mannonic- and quinic-acid with a trivalent antimony compound of the group consisting of antimony-oxide, antimony-hydroxide and antimony-halogenides, and neutralizing the reaction mixture with an alkali metal hydroxide.

7. The process which comprises reacting upon gluconic acid with antimony trichloride and neutralizing the reaction mixture with an alkali metal hydroxide.

8. The process which comprises reacting upon an aqueous solution of gluconic acid with antimony trichloride and neutralizing with an alkali metal hydroxide.

9. The process which comprises reacting upon saccharic acid with antimony trichloride and neutralizing the reaction mixture with an alkali metal hydroxide.

10. The process which comprises reacting upon an aqueous solution of saccharic acid with antimony trichloride and neutralizing with an alkali metal hydroxide.

11. The process which comprises reacting upon an aqueous solution of about one mol. of gluconic acid with an alcoholic solution of about one mol. of antimony trichloride and neutralizing with dilute caustic soda lye.

12. The process which comprises reacting upon an aqueous solution of about one mol. of saccharic acid with an alcoholic solution of about one mol. of antimony trichloride and neutralizing with dilute caustic soda lye.

HANS SCHMIDT.